United States Patent
Macken et al.

(10) Patent No.: US 6,437,949 B1
(45) Date of Patent: Aug. 20, 2002

(54) SINGLE DOMAIN STATE LAMINATED THIN FILM STRUCTURE

(75) Inventors: Declan Macken; Gavin Brinkley, both of County Derry (IE)

(73) Assignee: Seagate Technology LLC, Scotts Valley, CA (US)

( * ) Notice: Subject to any disclaimer, the term of this patent is extended or adjusted under 35 U.S.C. 154(b) by 46 days.

(21) Appl. No.: 09/649,984

(22) Filed: Aug. 29, 2000

Related U.S. Application Data

(60) Provisional application No. 60/181,116, filed on Feb. 8, 2000.

(51) Int. Cl.[7] ............................................. G11B 5/11
(52) U.S. Cl. ....................................................... 360/319
(58) Field of Search ................................ 360/319, 324.1, 360/324.11, 324.12

(56) References Cited

U.S. PATENT DOCUMENTS

| | | | |
|---|---|---|---|
| 4,103,315 A | | 7/1978 | Hempstead et al. ......... 360/110 |
| 4,195,323 A | * | 3/1980 | Lee ............................. 360/126 |
| 4,447,839 A | * | 5/1984 | Desserre et al. ............. 324/210 |
| 5,032,945 A | * | 7/1991 | Argyle et al. ................ 360/125 |
| 5,208,715 A | | 5/1993 | Mowry ........................ 360/319 |
| 5,465,185 A | * | 11/1995 | Heim et al. ............. 324/207.21 |
| 5,515,221 A | | 5/1996 | Gill et al. ..................... 360/319 |
| 5,621,592 A | | 4/1997 | Gill et al. ..................... 360/319 |
| 5,761,011 A | * | 6/1998 | Miyauchi et al. ............ 360/319 |
| 5,805,392 A | * | 9/1998 | Mallary et al. .............. 360/126 |
| 5,838,521 A | | 11/1998 | Ravipati ...................... 360/319 |
| 6,018,443 A | | 1/2000 | Watanabe et al. ........... 360/319 |
| 6,292,334 B1 | * | 9/2001 | Koike et al. ................. 360/319 |
| 6,327,121 B1 | * | 12/2001 | Nagasawa et al. ...... 360/324.11 |

OTHER PUBLICATIONS

"Magnetization and Switching Characteristics of Composite Thin Magnet Films" by E. Goto et al, *Journal of Applied Physics*, pp. 10–17, vol. 36, No. 9, Sep. 1965.

"Interactions in Multilayer Magnet Films" by A Yelon, *Physics of Thin Films*, vol. 6, Ch. 4, pp. 205–300, 1971.

"Micromagnetics of Laminated Permalloy Films" by J. Slonczewski et al., *IEEE Transactions on Magnetics*, vol. 24, No. 3, pp. 2–17, ©1988.

* cited by examiner

*Primary Examiner*—David L. Ometz
(74) *Attorney, Agent, or Firm*—Kinney & Lange, P.A.

(57) ABSTRACT

A thin film structure suitable for use as a shield for a read element of a transducing head has a first ferromagnetic layer, a second ferromagnetic layer, a spacer layer and a bias layer. The spacer layer is positioned between the first ferromagnetic layer and the second ferromagnetic layer. The bias layer is positioned adjacent the first ferromagnetic layer. A product of a thickness of the first ferromagnetic layer and a magnetic moment of the first ferromagnetic layer is substantially equal to a product of a thickness of the second ferromagnetic layer and a magnetic moment of the second ferromagnetic layer. An easy axis of the first ferromagnetic layer is substantially parallel to an easy axis of the second ferromagnetic layer.

18 Claims, 5 Drawing Sheets

SINGLE DOMAIN STATE LAMINATED THIN FILM STRUCTURE

CROSS-REFERENCE TO RELATED APPLICATION(S)

This application claims the priority from provisional U.S. patent application No. 60/181,116, filed on Feb. 8, 2000 for "Strategy for Elimination of Domain Walls From the Shields of MR Sensors" of Declan Macken and Gavin Brinkley.

BACKGROUND OF THE INVENTION

The present invention relates generally to the field of electronic data storage and retrieval systems. In particular, the present invention relates to a novel lamination of materials which provides a single domain state shield for a magnetoresistive element of a transducing head.

In an electronic data storage and retrieval system, a transducing head typically includes a reader portion having a magnetoresistive (MR) sensor for retrieving magnetically-encoded information stored on a magnetic disc. MR sensors fall generally into two broad categories: (1) anisotropic magnetoresistive (AMR) sensors and (2) giant magnetoresistive (GMR) sensors. AMR sensors generally having a single MR layer formed of a ferromagnetic material. The resistance of the MR layer varies as a function of $\cos^2\alpha$, where $\alpha$ is the angle formed between the magnetization vector of the MR layer and the direction of the sense current flowing in the MR layer.

GMR sensors have a series of alternating magnetic and nonmagnetic layers. The resistance of GMR sensors varies as a function of the spin-dependent transmission of the conduction electrons between the magnetic layers separated by the nonmagnetic layer and the accompanying spin-dependent scattering which takes place at the interface of the magnetic and nonmagnetic layers and within the magnetic layers.

GMR sensors using two layers of ferromagnetic material separated by a layer of nonmagnetic electrically-conductive material are generally referred to as spin valve (SV) sensors. The layers of a SV sensor include a nonmagnetic spacer layer positioned between a ferromagnetic pinned layer and a ferromagnetic free layer. A magnetization of the pinned layer is fixed in a predetermined direction, typically normal to an air bearing surface (ABS) of the SV sensor, while a magnetization of the free layer rotates freely in response to an external magnetic field. An antiferromagnetic material is typically exchange coupled to the pinned layer to fix the magnetization of the pinned layer in a predetermined direction, although other means of fixing the magnetization of the pinned layer are available.

GMR sensors using two layers of ferromagnetic material separated by a layer of nonmagnetic electrically-insulating material are generally referred to as spin-dependent tunnel junction (STJ) sensors. The layers within a STJ sensor include an ultra-thin tunnel barrier layer positioned between a ferromagnetic pinned layer and a ferromagnetic free layer. As in the SV sensor, a magnetization of the pinned layer is fixed in a predetermined direction, typically normal to an air bearing surface of the STJ sensor, while a magnetization of the free layer rotates freely in response to an external magnetic field. An antiferromagnetic material is typically exchange coupled to the pinned layer to fix the magnetization of the pinned layer in a predetermined direction, although other means of fixing the magnetization of the pinned layer are available.

Magnetic flux from the surface of the disc causes rotation of the magnetization vector of a sensing layer of the MR sensor, which in turn causes a change in electrical resistivity of the MR sensor. The change in resistivity of the MR sensor can be detected by passing a current through the MR sensor and measuring a voltage across the MR sensor. External circuitry then converts the voltage information into an appropriate format and manipulates that information as necessary.

A response curve of the MR sensor compares the voltage across the MR sensor to the magnetic flux received from the disc by the sensor. This response curve has both linear and non-linear portions, of which it is preferred that the MR sensor operate along the linear portions. To force the MR sensor to operate along the linear portions, the sensor is magnetically biased at a biasing point that is located along the linear portion of the response curve.

During a read operation, the top and bottom shields ensure that the MR sensor reads only the information stored directly beneath it on a specific track of the magnetic medium or disc by absorbing any stray magnetic fields emanating from adjacent tracks and transitions.

Within a typical shield exists a plurality of magnetic domains separated from each other by a plurality of magnetic domain walls. Each domain has a magnetization that is oriented in a direction different than the magnetization of all adjacent domains. The application of an external magnetic field, either during manufacture or from an adjacent track or transition of the magnetic storage medium during operation, to the bottom shield can cause the magnetization of each of the domains within that shield to rotate, thereby causing the domains to move. Because of the random nature of the domain wall location, the domain walls generally do not return to their original location after the external magnetic field is removed.

The shields exert stray magnetic fields on the MR sensor. These stray fields are accounted for when the MR sensor is biased. As the domain walls move, however, these stray magnetic fields change, thus changing the bias point of the MR sensor, as well as the response of the MR sensor to signals emanating from the rotating disc. The overall result is noise during the read operation.

This noise due to movement of domain walls is particularly acute in bottom shields for GMR sensors. The processing of a GMR sensor, either a SV or a STJ sensor, typically requires the magnetic annealing of an antiferromagnetic layer to pin the magnetization of its pinned layer. This magnetic anneal is performed while the bottom shield is present and can cause a realignment of the bottom shield anisotropy, giving rise to a highly undesirable domain configuration.

To avoid the problems associated with domain wall movement, the ideal shield structure would have no domain walls. A reduction of domain wall density (or an elimination of domains) from magnetic thin film structures can be achieved by use of a lamination consisting of alternating ferromagnetic films and nonmagnetic spacer films. By equating the thicknesses of each of the ferromagnetic films, a coupling will occur between those films, providing an alternate flux closure path that prevents domain wall formation. Although such structures have greatly reduced demagnetization fields over un-laminated single layer structures, they often feature undesirable edge-closure walls. Additionally, these structures require a very high level of control over layer thicknesses.

Others have proposed that antiferromagnetic layers can be used to bias the shields of MR sensors, thus resulting in a controlled domain structure. Hard bias or antiferromagnetic layers may be exchange coupled to large sheet films of soft ferromagnetic layers to bias those sheet films into a saturated state. Achievement of a single domain state in the soft ferromagnetic film is dependent upon the exchange field and soft film thickness. The use of such a structure as a shield for an MR sensor, however, is unfeasible since the demagnetization fields associated with structures of the requisite dimensions would be so large as to overcome any induced bias. This would result in a multi-domain structure.

BRIEF SUMMARY OF THE INVENTION

The present invention is a thin film structure, suitable for use as a shield for an MR sensor, that can be maintained in a single domain state. The thin film structure of the present invention has an unbiased ferromagnetic layer, a biased ferromagnetic layer, a spacer layer and a bias layer. The spacer layer is positioned between the unbiased ferromagnetic layer and the biased ferromagnetic layer. The bias layer is positioned adjacent the biased ferromagnetic layer. A product of A thickness of the biased ferromagnetic layer and a magnetic moment of the biased ferromagnetic layer is substantially equal to a product of a thickness of the unbiased ferromagnetic layer and a magnetic moment of the unbiased ferromagnetic layer. An easy axis of the biased ferromagnetic layer is substantially parallel to an easy axis of the unbiased ferromagnetic layer.

An alternate embodiment of the present invention includes a plurality of thin film structures as described above and a plurality of structure spacer layers interspersed between each of the plurality of thin film structures. In this alternate embodiment, the plurality of thin film structures is arranged to alternate the biased ferromagnetic layers and the unbiased ferromagnetic layers of the plurality of thin film structures.

The thin film structures of the present invention are particularly useful as shields for a read element of a transducing head having a bottom shield, a bottom gap layer positioned on the bottom shield, a read element positioned on the bottom gap layer, a top gap layer positioned on the read element and a top shield positioned on the top gap layer.

DETAILED DESCRIPTION

Figure 1:
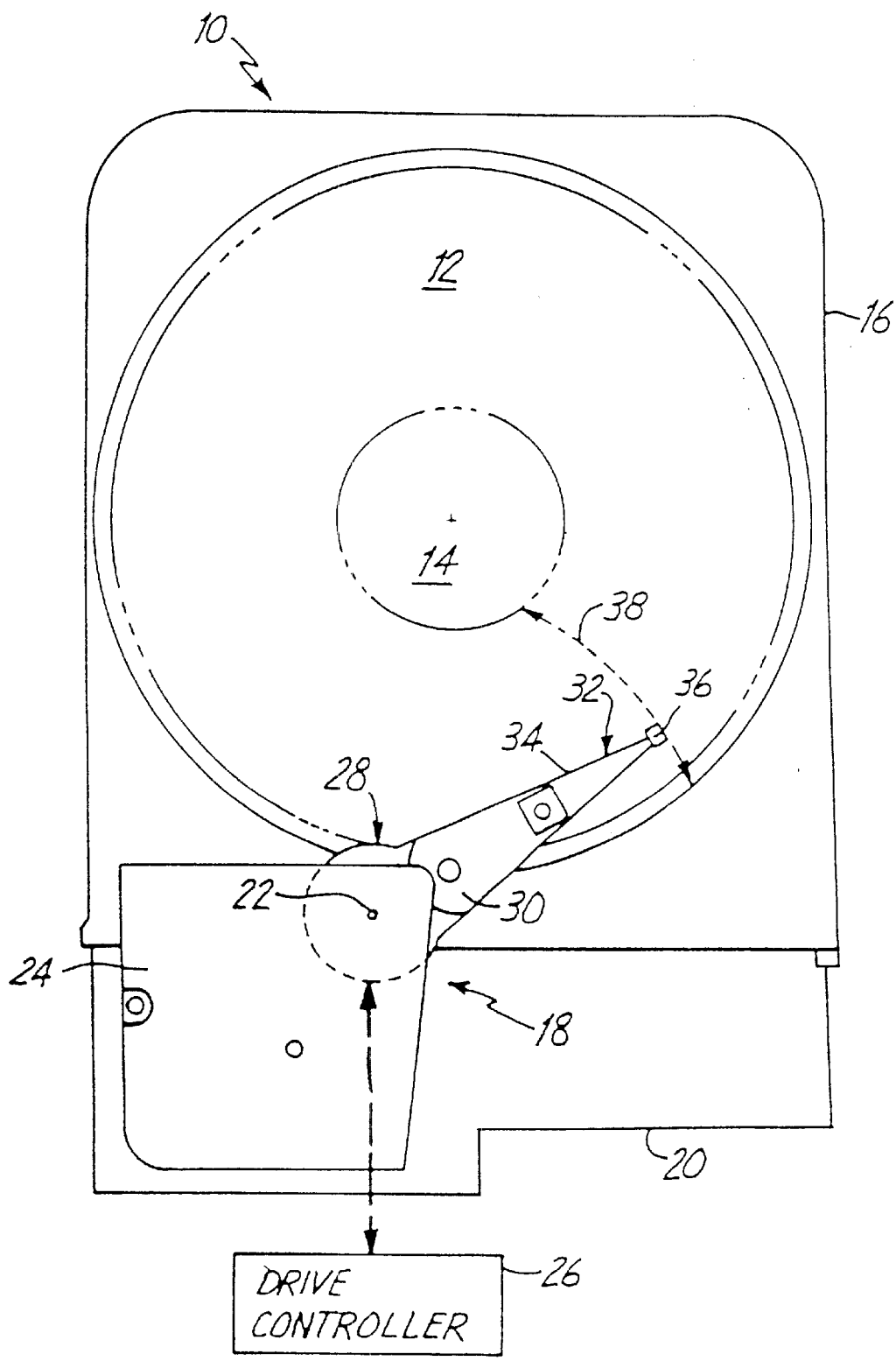
FIG. 1 is a top view of a disc drive system including a magnetoresistive read head in accord with the present invention.

FIG. 1 is a top view of disc drive system 10 including a magnetoresistive (MR) read head in accord with the present invention. Disc drive system 10 includes magnetic disc 12 mounted for rotational movement about an axis defined by spindle 14 within housing 16. Disc drive 10 also includes actuator 18 mounted to base plate 20 of housing 16 and pivotally movable relative to disc 14 about axis 22. Cover 24 covers a portion of actuator 18. Drive controller 26 is coupled to actuator 18. Drive controller 26 is either mountable within disc drive system 10 or is located outside of disc drive system 10 with suitable connection to actuator 18. Actuator 18 includes actuator arm assembly 28, a rigid support member 30, and head gimbal assembly 32. Head gimbal assembly 32 includes flexure arm 34 couple to rigid member 30 and air bearing slider 36 couple to flexure arm 34 by a gimbal. Slider 36 supports a magnetoresistive transducer or head for reading information from disc 12 and encoding information to disc 12.

During operation, drive controller 26 receives position information indicating a portion of disc 12 to be accessed. Drive controller 26 receives the position information from either an operator, a host computer, or from another suitable controller. Based on the position information, drive controller 26 provides a position signal to actuator 18. The position signal causes actuator 18 to pivot about axis 22. This causes slider 36 to move radially over the surface of disc 12 in a generally arc-like path indicated by arrow 38. Drive controller 26 and actuator 18 operate in a known closed loop, negative feedback manner so that the transducer carried by slider 36 is positioned over the desired portion of disc 12. Once the transducer is appropriately positioned, drive controller 26 then executes a desired read or write operation.

Figure 2:
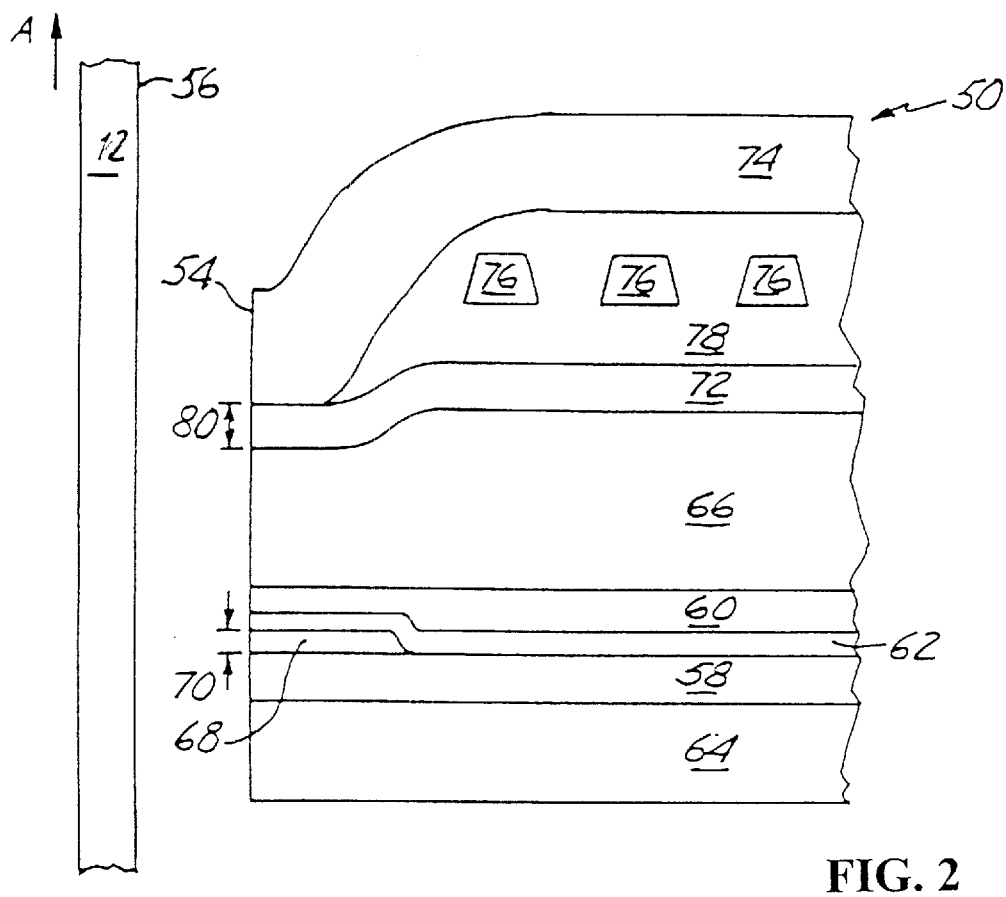
FIG. 2 is a cross-sectional view of a magnetic transducing head and a magnetic disc taken along a plane normal to an air bearing surface of the transducing head.

FIG. 2 is a cross-sectional view of magnetic transducing head 50 and magnetic disc 12 taken along a plane normal to air bearing surface 54 of read/write head 50. FIG. 2 illustrates magnetic transducing head 50 and its placement relative to magnetic disc 12. Air bearing surface 54 of magnetic transducing head 50 faces disc surface 56 of magnetic disc 12. Magnetic disc 12 travels or rotates in a direction relative to magnetic transducing head 50 as indicated by arrow A. The spacing between air bearing surface 54 and disc surface 56 is preferably minimized while avoiding contact between magnetic transducing head 50 and magnetic disc 12. In most cases, contact between magnetic transducing head 50 and magnetic disc 12 would destroy both magnetic transducing head 50 and magnetic disc 12.

A reader portion of transducing head 50 includes bottom gap layer 58, top gap layer 60, metal contact layer 62, bottom shield 64, top shield/bottom pole 66, and read element 68. Read gap 70 is defined on air bearing surface 54 between terminating ends of bottom gap layer 58 and metal contact layer 62. Metal contact layer 62 is positioned between bottom gap layer 58 and top gap layer 60. Read element 68 is positioned between terminating ends of bottom gap layer 58 and metal contact layer 62.

A writer portion of magnetic transducing head 50 includes top shield/bottom pole 66, write gap layer 72, top pole 74, conductive coil 76, and polymer layer 78. Write gap 80 is defined on air bearing surface 54 by write gap layer 72 between terminating ends of top pole 74 and top shield/bottom pole 66. Electrically conductive coils 76 are provided to generate magnetic fields across write gap 80 and are positioned in polymer layer 78 between top pole 74 and write gap layer 72. While FIG. 2 shows a single layer of conductive coils 76, it is understood in the art that several layers of conductive coils may be used separated by several polymer layers. Transducing head 50 is a merged MR head in which top shield/bottom pole 66 is employed both as a top shield in the reader portion and as a bottom pole in the writer portion. If read/write head 50 were a piggyback MR head, top shield/bottom pole 66 would be formed of separate layers.

Figure 3:
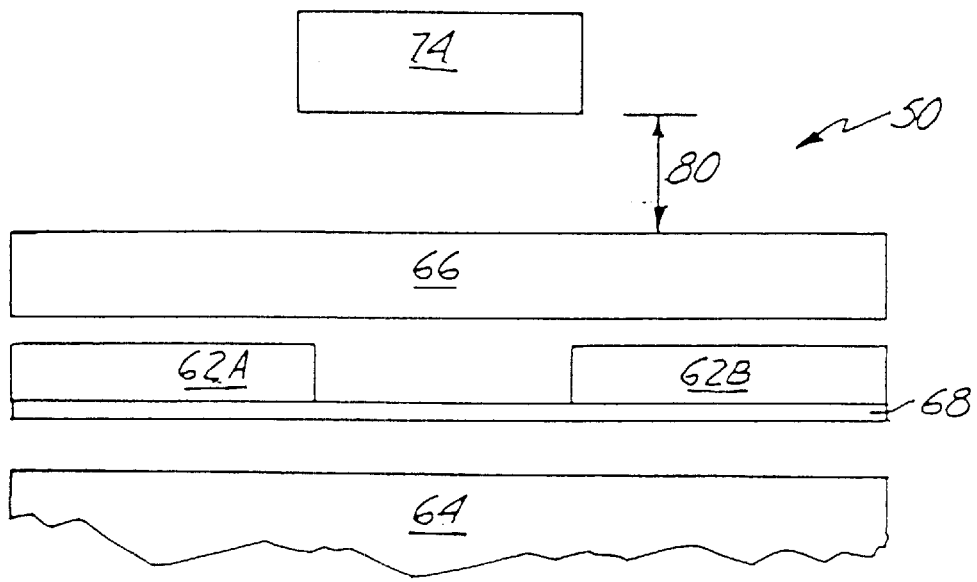
FIG. 3 is a layered diagram illustrating magnetically significant elements of the magnetic transducing head of FIG. 2.

FIG. 3 is a layered diagram of magnetic transducing head 50. FIG. 3 illustrates the location of a plurality of magnetically significant elements of magnetic transducing head 50 as they appear along air bearing surface 54 of magnetic read/write head 50 shown in FIG. 2. In FIG. 3, all spacing and insulating layers are omitted for clarity. Bottom shield 64 and top shield/bottom pole 66 are spaced to provide for a location of read element 68. Read element 68 has two passive regions defined as the portions of read element 68 positioned adjacent to metal contacts 62A and 62B. An active region of read element 68 is defined as the portion of read element 68 located between the two passive regions of read element 68. The active region of read element 68 defines a read sensor width.

Read element 68 is preferably a MR element or a giant magnetoresistive (GMR) stack. A MR element is generally formed of a ferromagnetic material whose resistance fluctuates in response to an external magnetic field, preferably from a magnetic medium or disc. GMR sensors have a series of alternating magnetic and nonmagnetic layers. The resistance of a GMR sensor varies as a function of the spin-dependent transmission of the conduction electrons between the magnetic layers separated by the nonmagnetic layer and the accompanying spin-dependent scattering which takes place at the interface of the magnetic and nonmagnetic layers and within the magnetic layers.

GMR sensors using two layers of ferromagnetic material separated by a layer of nonmagnetic electrically-conductive material are generally referred to as spin valve (SV) sensors. The layers of a SV sensor include a nonmagnetic spacer layer positioned between a ferromagnetic pinned layer and a ferromagnetic free layer. A magnetization of the pinned layer is fixed in a predetermined direction, typically normal to an air bearing surface (ABS) of the SV sensor, while a magnetization of the free layer rotates freely in response to an external magnetic field. An antiferromagnetic material is typically exchange coupled to the pinned layer to fix the magnetization of the pinned layer in a predetermined direction, although other means of fixing the magnetization of the pinned layer are available.

GMR sensors using two layers of ferromagnetic material separated by a layer of nonmagnetic electrically-insulating material are generally referred to as spin-dependent tunnel junction (STJ) sensors. The layers within a STJ sensor include an ultra-thin tunnel barrier layer positioned between a ferromagnetic pinned layer and a ferromagnetic free layer. As in the SV sensor, a magnetization of the pinned layer is fixed in a predetermined direction, typically normal to an air bearing surface of the STJ sensor, while a magnetization of the free layer rotates freely in response to an external magnetic field. An antiferromagnetic material is typically exchange coupled to the pinned layer to fix the magnetization of the pinned layer in a predetermined direction, although other means of fixing the magnetization of the pinned layer are available.

Magnetic flux from the surface of the disc causes rotation of the magnetization vector of a sensing layer of the MR sensor, which in turn causes a change in electrical resistivity of the MR sensor. The change in resistivity of the MR sensor can be detected by passing a current through the MR sensor and measuring a voltage across the MR sensor. External circuitry then converts the voltage information into an appropriate format and manipulates that information as necessary.

During a read operation, shields 64 and 66 ensure that read element 68 reads only the information stored directly beneath it on a specific track of magnetic disc 12 by absorbing any stray magnetic fields emanating from adjacent tracks and transitions.

Within a typical shield exists a plurality of magnetic domains separated from each other by a plurality of magnetic domain walls. Each domain has a magnetization that is oriented in a direction different than the magnetization of all adjacent domains. The application of an external magnetic field, either during manufacture or from an adjacent track or transition of the magnetic storage medium during operation, to bottom shield 64 can cause the magnetization of each of the domains within shield 64 to rotate, thereby causing the domains to move. Because of the random nature of the domain wall location, the domain walls generally do not return to their original location after the external magnetic field is removed.

Shields 64 and 66 exert stray magnetic fields on the MR sensor. These stray fields are accounted for when the MR sensor is biased. As the domain walls move, however, these stray magnetic fields change, thus changing the bias point of the MR sensor, as well as the response of the MR sensor to signals emanating from the rotating disc. The overall result is noise during the read operation.

To avoid the problems associated with domain wall movement, the ideal shield structure would have no domain walls. The present invention achieves a single magnetic domain state in a magnetic shield by forming the shield of a novel lamination of materials.

Figure 4:
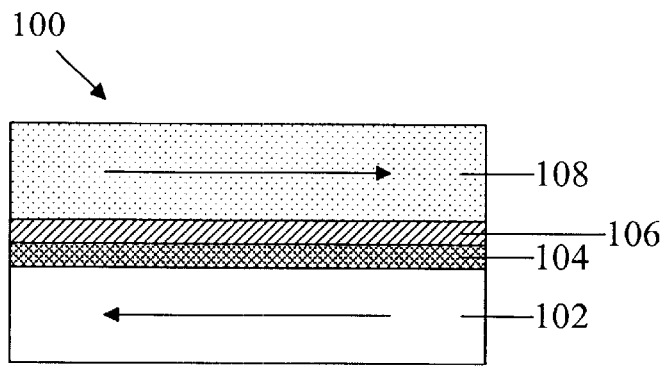
FIG. 4–FIG. 11 are layer diagrams of shields formed of novel laminations of materials in accord with the present invention.

FIG. 4 is a layer diagram of shield 100 formed of a novel lamination of materials in accord with the present invention. Shield 100 is formed of unbiased layer 102, spacer layer 104, biasing layer 106 and biased layer 108.

Each of unbiased layer 102 and biased layer 108 is preferably formed of a soft ferromagnetic material having anisotropic properties, such as NiFe, a cobalt amorphous alloy, FeN, permalloy or sendust. In a preferred embodiment, a product of a thickness of unbiased layer 102 and a magnetic moment of unbiased layer 102 preferably equals a product of a thickness of biased layer 108 and a magnetic moment of biased layer 108, and an easy axis of unbiased layer 102 is preferably parallel to an easy axis of biased layer 108.

Biasing layer 106 is placed adjacent to biased layer 108, such that biasing layer 106 is positioned between spacer layer 104 and biased layer 108. Biasing layer 106 is preferably formed of either a permanent magnet material (e.g., a hard magnetic material), such as CoPt, CoCrPt, CoCrTa or CoPdCr, or an antiferromagnetic material, such as NiMn, NiMnCr, PtMn, PdPtMn, CrMnPt, CrMnCu, CrMnPd or PtRuMn. Biasing layer 106 is exchange coupled with biased layer 108 to bias, or set, a magnetization of biased layer 108 along the easy axis of biased layer 108.

Spacer layer 104 is preferably a pinhole free thin (approximately 300 Å) layer of a nonmagnetic material, such as tantalum, alumina, silica, copper, gold or silver. Nonmagnetic spacer 104, which is positioned between unbiased layer 102 and biasing layer 106 prevents exchange coupling between unbiased layer 102 and biasing layer 106. Thus, a magnetization of unbiased layer 102 is oriented antiparallel to the magnetization of biased layer 108 due to demagnetization fields from biased layer 108.

Nonmagnetic spacer 104 has a dramatic effect on reducing demagnetization fields within shield 100, thereby allowing shield 100 to operate in a single magnetic domain state. Furthermore, this multi-layer lamination of shield 100 allows for the magnetizations of unbiased layer 102 and biased layer 108 to each be saturated along respective easy axes while leaving virtually unaffected the coherent rotation of magnetizations of on hard axes of respective unbiased layer 102 and biased layer 108. This feature is very important for magnetic shield applications since the shield must be allowed to absorb stray magnetic flux from adjacent bits or tracks on the magnetic disc by a process of coherent rotation.

Figure 5:
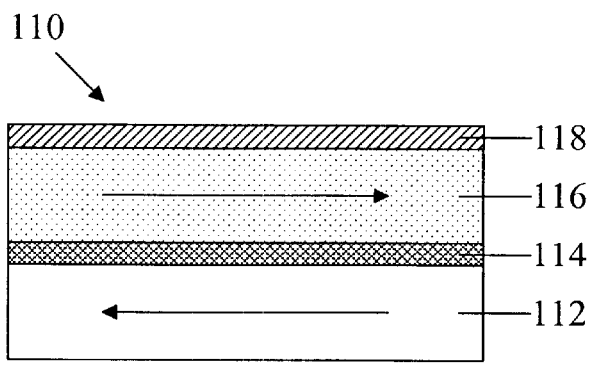

FIG. 5 is a layer diagram of shield 110 formed of a novel lamination of materials in accord with the present invention. Shield 110 is formed of unbiased layer 112, spacer layer 114, biased layer 116 and biasing layer 118. Shield 110 is identical to shield 100 of FIG. 4, except that locations of biased layer 116 and biasing layer 118 of shield 110 are reversed from locations of biasing layers 106 and biased layer 108 of shield 100. Otherwise, each layer of shield 110 is identical to the respective layer of shield 100.

Each of unbiased layer 112 and biased layer 116 is preferably formed of a soft ferromagnetic material having anisotropic properties, such as NiFe, a cobalt amorphous alloy, FeN, permalloy or sendust. In a preferred embodiment, a product of a thickness of unbiased layer 112 and a magnetic moment of unbiased layer 112 preferably equals a product of a thickness of biased layer 116 and a magnetic moment of biased layer 116, and an easy axis of unbiased layer 112 is preferably parallel to an easy axis of biased layer 116.

Biasing layer 118 is placed adjacent to biased layer 116, such that biased layer 116 is positioned between spacer layer 114 and biasing layer 118. Biasing layer 118 is preferably formed of either a permanent magnet material (e.g., a hard magnetic material), such as CoPt, CoCrPt, CoCrTa or CoPdCr, or an antiferromagnetic material, such as NiMn, NiMnCr, PtMn, PdPtMn, CrMnPt, CrMnCu, CrMnPd or PtRuMn. Biasing layer 118 is exchange coupled to biased layer 116 to bias, or set, a magnetization of biased layer 116 along the easy axis of biased layer 116.

Spacer layer 114 is preferably a pinhole free thin (approximately 300 Å) layer of a nonmagnetic material, such as tantalum, alumina, silica, copper, gold or silver. Nonmagnetic spacer 114, which is positioned between unbiased layer 112 and biased layer 116 prevents exchange coupling between unbiased layer 112 and biased layer 116. Thus, a magnetization of unbiased layer 112 is oriented antiparallel to the magnetization of biased layer 116 due to demagnetization fields from biased layer 116.

As with shield 100, nonmagnetic spacer 114 has a dramatic effect on reducing demagnetization fields within shield 110, thereby allowing shield 110 to operate in a single magnetic domain state. Furthermore, this multi-layer lamination of shield 110 allows for the magnetizations of unbiased layer 112 and biased layer 116 to each be saturated along respective easy axes while leaving virtually unaffected the coherent rotation of magnetizations of on hard axes of respective unbiased layer 112 and biased layer 116. This feature is very important for magnetic shield applications since the shield must be allowed to absorb stray magnetic flux from adjacent bits or tracks on the magnetic disc by a process of coherent rotation.

Figure 6:
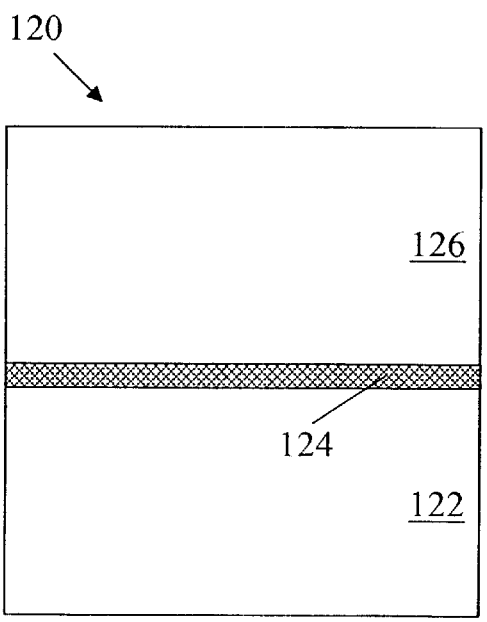
Figure 7:
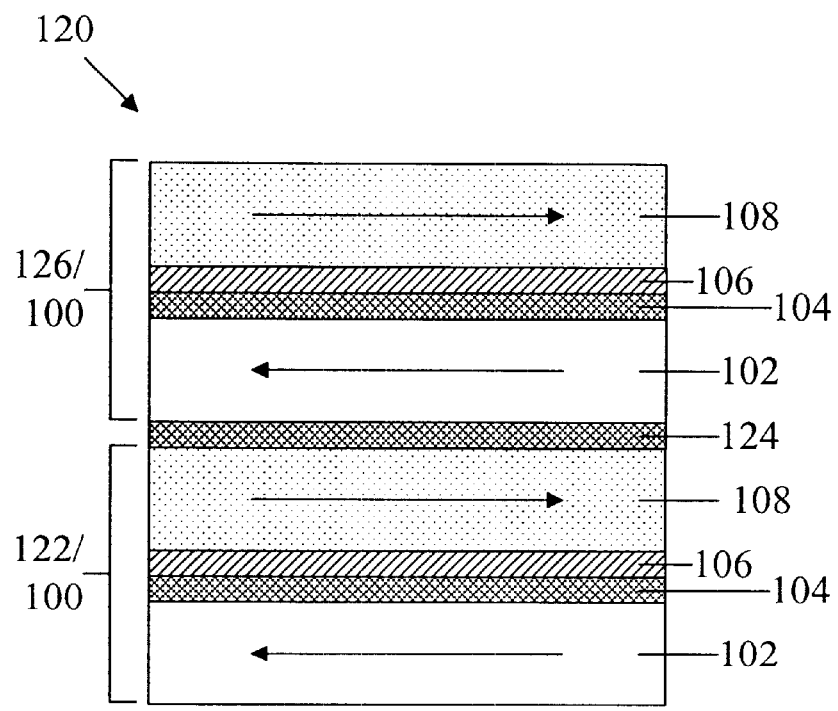
Figure 8:
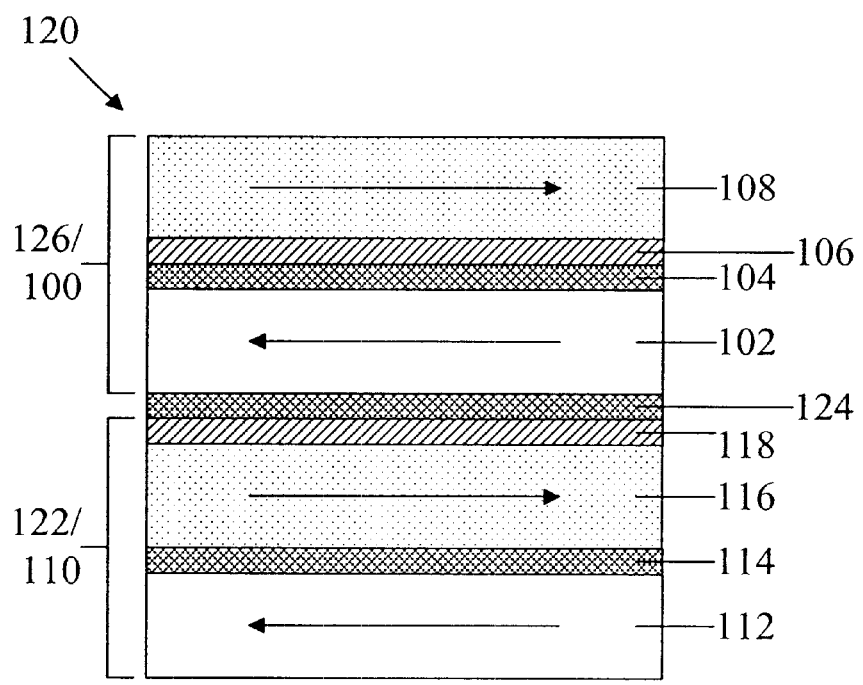

FIG. 6 is a layer diagram of shield 120 formed of a novel lamination of materials in accord with the present invention. Shield 120 is formed of first structure 122, second structure 126, and structure spacer layer 124 positioned between first and second structures 122 and 126. Each of first and second structures 122 and 126 is preferably formed of a structure similar to that of either shield 100 or 110. FIGS. 7 and 8 are each examples of structure 120 of FIG. 6. As shown in FIG. 7, each of first and second structures 122 and 126 of shield 120 has been formed of a structure similar to that of shield 100. In the example of FIG. 8, first structure 122 has been formed of a structure similar to that of shield 110, while second structure 126 has been formed of a structure similar to that of shield 100.

When combining two structures to form shield 120, the unbiased and biased layers must be alternated to ensure that the magnetizations of ferromagnetic layers are antiparallel, thereby minimizing the overall demagnetization fields within shield 120. Thus, in the example of FIG. 7, biased layer 108 of first structure 122 is positioned between unbiased layers 102 of first and second structures 122 and 126, and unbiased layer 102 of second structure 126 is positioned between biased layers 108 of first and second structures 122 and 126. Similarly in the example of FIG. 8, biased layer 116 of first structure 122 is positioned between unbiased layer 112 of first structure 122 and unbiased layer 102 of second structure 126, while unbiased layer 102 is positioned between biased layer 116 of first structure 122 and biased layer 108 of second structure 126.

To build an even thicker shield, additional structures, separated by structure spacer layers, can be added to shield 120 of FIG. 6. A shield of the present invention can be built from any of a plurality of thin film structures as illustrated in FIGS. 4 and 5 and a plurality of structure spacer layers interspersed between each of the thin film structures. As with the two structure embodiment of FIG. 6, the plurality of structures must be arranged to alternate the unbiased and biased ferromagnetic layers to minimize the demagnetization fields within the final shield structure. Importantly, in such a multi-structure stack, the bias layers of each individual structure need not exclusively be formed of a permanent magnet material or an antiferromagnetic material, but may be a combination of both.

Figure 9:
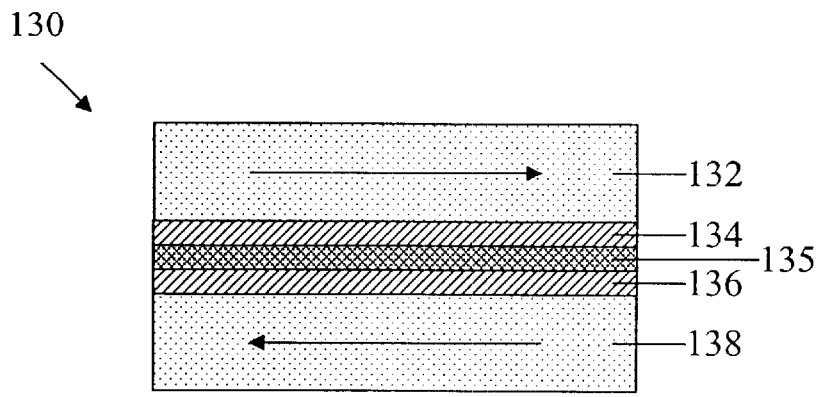

FIG. 9 is a layer diagram of shield 130 formed of a novel lamination of materials in accord with the present invention. Rather than being formed of an unbiased layer and a biased layer, shield 130 is formed of two biased layers separated by a spacer. Shield 130 is formed of first biased layer 132, first biasing layer 134, spacer layer 135, second biasing layer 136 and second biased layer 138.

Each of first and second biased layers 132 and 138 is preferably formed of a soft ferromagnetic material having anisotropic properties, such as NiFe, a cobalt amorphous alloy, FeN, permalloy or sendust. In a preferred embodiment, a product of a thickness of first biased layer 132 and a magnetic moment of first biased layer 132 preferably equals a thickness of second biased layer 138 and a magnetic moment of biased layer 138, and an easy axis of first biased layer 132 is preferably parallel to an easy axis of second biased layer 138.

First biasing layer 134 is placed adjacent to first biased layer 132, such that first biasing layer 134 is positioned between first biased layer 132 and spacer layer 135. Second biasing layer 136 is positioned adjacent second biased layer 138, such that second biasing layer 136 is positioned between spacer layer 135 and second biased layer 138. Each of first and second biasing layers 134 and 136 is preferably formed of either a permanent magnet material (e.g., a hard magnetic material), such as CoPt, CoCrPt, CoCrTa or CoPdCr, or an antiferromagnetic material, such as NiMn, NiMnCr, PtMn, PdPtMn, CrMnPt, CrMnCu, CrMnPd or PtRuMn. First and second biasing layers 134 and 136 are exchange coupled with respective first and second biased layers 132 and 138 to bias, or set, a magnetization of first and second biased layer 132 and 138 along the easy axes of first and second biased layer 136 and 138. Preferably a magnetization of biased layer 132 is set in a direction antiparallel to a magnetization of biased layer 138.

Spacer layer 135 is preferably a pinhole free thin (approximately 300 Å) layer of a nonmagnetic material, such as tantalum, alumina, silica, copper, gold or silver. Nonmagnetic spacer 135, which is positioned between first biasing layer 134 and second biasing layer 136 prevents exchange coupling between first biased layer 132 and second biased layer 138.

Figure 10:
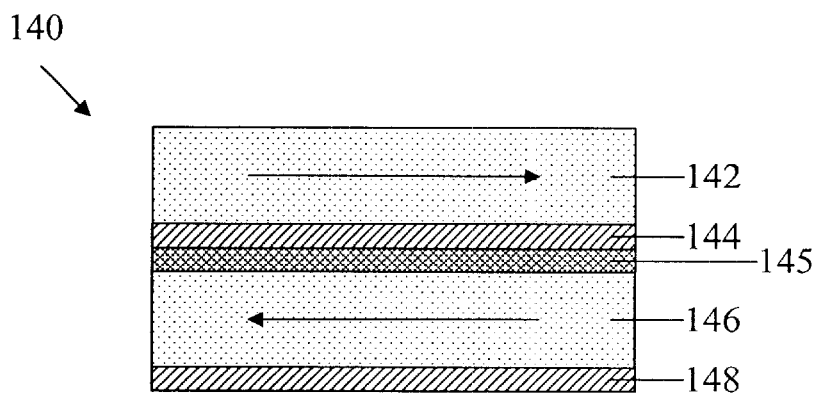

FIG. 10 is a layer diagram of shield 140 formed of a novel lamination of materials in accord with the present invention. Similarly to shield 130 of FIG. 9, shield 140 is formed of first biased layer 142, first biasing layer 144, spacer layer 145, second biased layer 146 and second biasing layer 148. Each of first and second biased layers 142 and 146 is preferably formed of a soft ferromagnetic material having anisotropic properties, such as NiFe, a cobalt amorphous alloy, FeN, permalloy or sendust. In a preferred embodiment, a product of a thickness of first biased layer 142 and a magnetic moment of first biased layer 142 preferably equals a product of a thickness of second biased layer 146 and a magnetic moment of first biased layer 142, and an easy axis of first biased layer 142 is preferably parallel to an easy axis of second biased layer 146.

First biasing layer 144 is placed adjacent to first biased layer 142, such that first biasing layer 144 is positioned between first biased layer 142 and spacer layer 145. Second biasing layer 148 is positioned adjacent second biased layer 146, such that second biased layer 146 is positioned between spacer layer 145 and second biasing layer 148. Each of first and second biasing layers 144 and 148 is preferably formed of either a permanent magnet material (e.g., a hard magnetic material), such as CoPt, CoCrPt, CoCrTa or CoPdCr, or an antiferromagnetic material, such as NiMn, NiMnCr, PtMn, PdPtMn, CrMnPt, CrMnCu, CrMnPd or PtRuMn. First and second biasing layers 144 and 148 are exchange coupled with respective first and second biased layers 142 and 146 to bias, or set, a magnetization of first and second biased layer 142 and 146 along the easy axes of first and second biased layer 144 and 148. Preferably a magnetization of biased layer 142 is set in a direction antiparallel to a magnetization of biased layer 146.

Spacer layer 145 is preferably a pinhole free thin (approximately 300 Å) layer of a nonmagnetic material, such as tantalum, alumina, silica, copper, gold or silver. Nonmagnetic spacer 145, which is positioned between first biasing layer 144 and second biased layer 146 prevents exchange coupling between first biased layer 142 and second biased layer 146.

Figure 11:
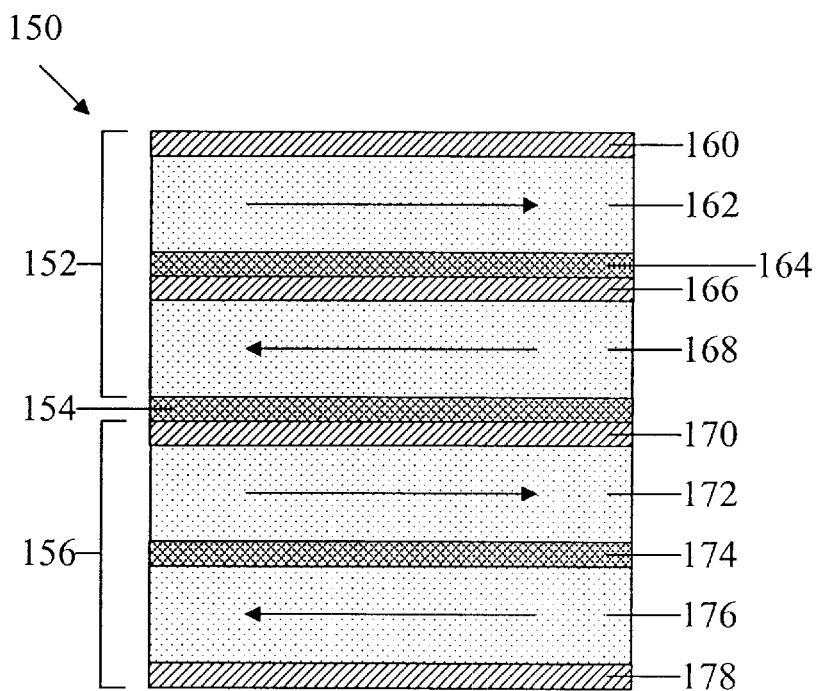

FIG. 11 is a layer diagram of shield 150 formed of a novel lamination of materials in accord with the present invention. Shield 150 is formed of first structure 152, second structure 156, and structure spacer layer 154 positioned between first and second structures 152 and 156. Each of first and second structures 152 and 156 is preferably formed of a structure similar to that of shield 100, shield 110, shield 130, shield 140 or a similar structure. As shown in FIG. 11, structure 152 is formed of first biasing layer 160, first biased layer 162, spacer layer 164, second biasing layer 166 and second biased layer 168 and second structure 156 is formed of first biasing layer 170, first biased layer 172, spacer layer 174, second biased layer 176 and second biasing layer 178.

Within first structure 152, spacer layer 164 is positioned between first and second biased layers 162 and 168, first biased layer 162 is positioned between first biasing layer 160 and spacer layer 164 and second biasing layer 166 is positioned between spacer layer 164 and second biased layer 168. Within second structure 156, spacer layer 174 is positioned between first and second biased layers 172 and 176, first biased layer 172 is positioned between first biasing layer 170 and spacer layer 174 and second biased layer 176 is positioned between spacer layer 174 and second biasing layer 178. Each layer of shield 150 has properties similar to those described above with reference to shields 130 and 140.

When combining two structures to form shield 150, the magnetization of each of the biased layers must be alternated to ensure that the magnetizations of ferromagnetic layers are antiparallel, thereby minimizing the overall demagnetization fields within shield 150. Thus, in the example of FIG. 11, the magnetization of first biased layer 162 of first structure 152 is parallel to the magnetization of first biased layer 172 of second structure 156 and antiparallel to the magnetization of both second biased layer 168 of first structure 152 and second biased layer 176 of second structure 156.

To build an even thicker shield, additional structures, separated by structure spacer layers, can be added to shield 150 of FIG. 11. A shield of the present invention can be built from any of a plurality of thin film structures as illustrated in FIGS. 4, 5, 9 and 10 and a plurality of structure spacer layers interspersed between each of the thin film structures. As with the two structure embodiment of FIG. 11, the plurality of structures must be arranged to alternate the magnetizations of the biased ferromagnetic layers to minimize the demagnetization fields within the final shield structure. Importantly, in such a multi-structure stack, the bias layers of each individual structure need not exclusively be formed of a permanent magnet material or an antiferromagnetic material, but may be a combination of both.

Although the present invention has been described with reference to preferred embodiments, workers skilled in the art will recognize that changes may be made in form and detail without departing from the spirit and scope of the invention.

What is claimed is:

1. A shield for a read element of a transducing head, the shield comprising:
   a first ferromagnetic layer;
   a second ferromagnetic layer having a thickness-magnetic moment product substantially equal to a thickness-magnetic moment product of the first ferromagnetic layer, an easy axis of the second ferromagnetic layer being substantially parallel to an easy axis of the first ferromagnetic layer;
   a nonmagnetic spacer layer positioned between the first ferromagnetic layer and the second ferromagnetic layer; and
   a first bias layer positioned adjacent the first ferromagnetic layer.

2. The shield of claim 1 wherein the first bias layer is formed of an antiferromagnetic material.

3. The shield of claim 1 wherein the first bias layer is formed of a permanent magnet material.

4. The shield of claim 1 and also comprising a second bias layer positioned adjacent the second ferromagnetic layer.

5. The shield of claim 4 wherein each of the first and the second bias layers is formed of a permanent magnet material.

6. The shield of claim 4 wherein one of the first and second bias layers is formed of an antiferromagnetic material and the other of the first and second bias layers is formed of a permanent magnet material.

7. The shield of claim 1 and also comprising:
   a third ferromagnetic layer;
   a fourth ferromagnetic layer having a thickness-magnetic moment product substantially equal to a thickness-magnetic moment product of the third ferromagnetic layer and an easy axis substantially parallel to an easy axis of the third ferromagnetic layer;

a second nonmagnetic spacer layer positioned between the third ferromagnetic layer and the fourth ferromagnetic layer;

a third bias layer positioned adjacent the third ferromagnetic layer; and a third spacer layer positioned such that the first and second ferromagnetic layers are on a side of the third spacer layer opposite the third and fourth ferromagnetic layers.

8. The shield of claim 7 wherein each of the first and third bias layers is formed of an antiferromagnetic material.

9. The shield of claim 7 wherein each of the first and third bias layers is formed of a permanent magnet material.

10. The shield of claim 7 wherein one of the first and third bias layers is formed of an antiferromagnetic material and the other of the first and third bias layers is formed of a permanent magnet material.

11. The shield of claim 7 and also comprising a second bias layer positioned adjacent the second ferromagnetic layer and a fourth bias layer positioned adjacent the fourth ferromagnetic layer.

12. The shield of claim 11 wherein at least one of the first, second, third or fourth bias layers is formed of an antiferromagnetic material.

13. The shield of claim 11 wherein at least one of the first, second, third or fourth bias layers is formed of a permanent magnet material.

14. A shield for a read element of a transducing head, the shield comprising a plurality of the thin film structures and a plurality of structure spacer layers interspersed between the plurality of thin film structures, wherein each of the plurality of thin film structures comprises:

a first ferromagnetic layer;

a second ferromagnetic layer having a thickness-magnetic moment product substantially equal to a thickness-magnetic moment product of the first ferromagnetic layer, an easy axis of the second ferromagnetic layer being substantially parallel to an easy axis of the first ferromagnetic layer;

a nonmagnetic spacer layer positioned between the first ferromagnetic layer and the second ferromagnetic layer; and a first bias layer positioned adjacent the first ferromagnetic layer;

and wherein the plurality of thin film structures are arranged to alternate the first and second ferromagnetic layers.

15. In a transducing head comprising:

a bottom shield;

a top shield;

a bottom gap layer positioned between the bottom shield and the top shield;

a top gap layer positioned between the bottom gap layer and the top shield; and a read element positioned between the bottom gap layer and the top gap layer;

an improvement comprising at least one of the bottom and top shields being formed of a thin film structure comprising:

a first ferromagnetic layer;

a second ferromagnetic layer having a thickness-magnetic moment product substantially equal to a thickness-magnetic moment product of the first ferromagnetic layer and an easy axis substantially parallel to an easy axis of the first ferromagnetic layer;

a nonmagnetic spacer layer positioned between the first ferromagnetic layer and the second ferromagnetic layer; and a bias layer positioned adjacent the first ferromagnetic layer.

16. The transducing head of claim 15 wherein the bias layer is formed of an antiferromagnetic material.

17. The transducing head of claim 15 wherein the bias layer is formed of a permanent magnet material.

18. The transducing head of claim 15 and also comprising a second bias layer positioned adjacent the second ferromagnetic layer.

* * * * *